May 2, 1944.  W. H. HIGGINS  2,347,739
SPRAYING SHEEP AND OTHER ANIMALS
Filed Dec. 30, 1940  3 Sheets-Sheet 1

Inventor,
W. H. Higgins
By: Glascock Downing & Seebold
Attys.

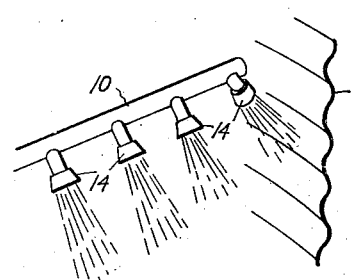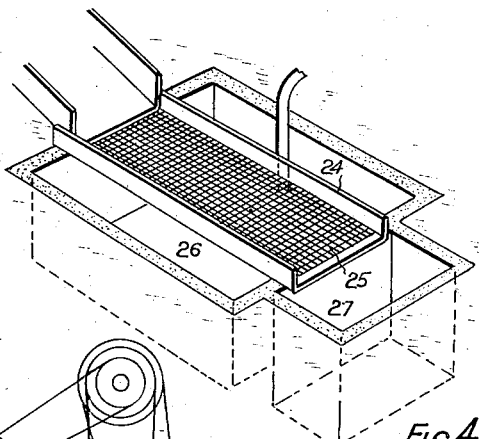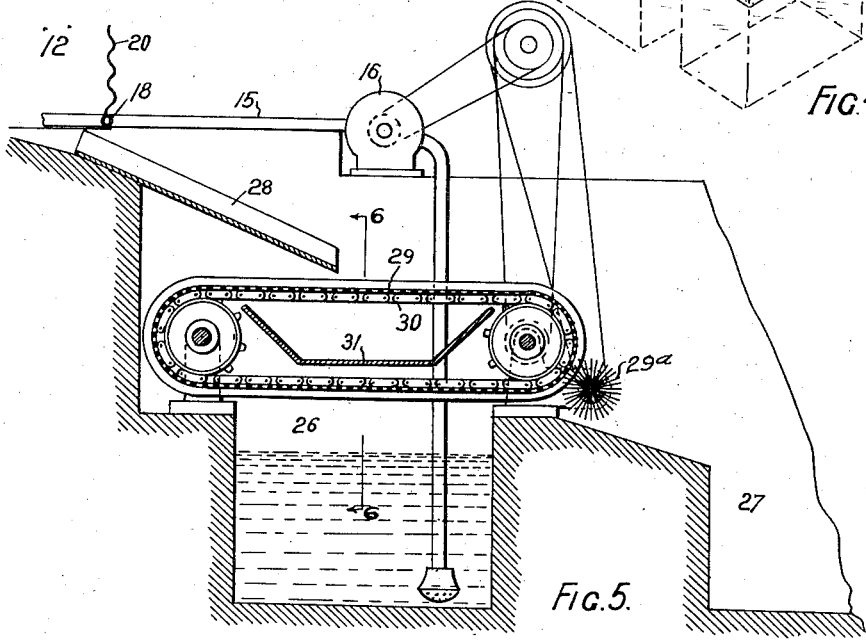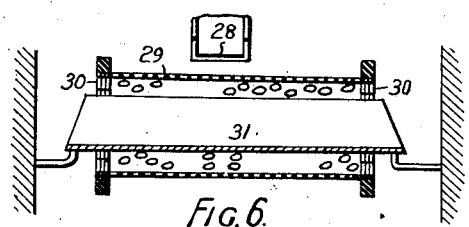

May 2, 1944. W. H. HIGGINS 2,347,739
SPRAYING SHEEP AND OTHER ANIMALS
Filed Dec. 30, 1940 3 Sheets-Sheet 3

INVENTOR
W. H. HIGGINS
BY
ATTORNEYS

Patented May 2, 1944

2,347,739

UNITED STATES PATENT OFFICE 2,347,739

SPRAYING SHEEP AND OTHER ANIMALS

Walter Henry Higgins, Wagga, New South Wales, Australia

Application December 30, 1940, Serial No. 372,409
In Australia January 6, 1940

5 Claims. (Cl. 119—159)

This invention relates to spraying sheep and other animals with fluids for stock treatment purposes.

In accordance with the present invention sheep, to be treated, are run into a pen or enclosure and sprayed by means of an overhead rotatable spray or sprays; the overhead rotatable spray may be in the form of rotatable arms carrying fixed spray nozzles, designed to give a rotating or equivalent character to the sprayed solution. If desired solution may be sprayed also from the sides and/or floor of the enclosure such sprays either being fixed or rotating. The enclosure is preferably of circular conformation and of such size that it is entirely showered by the rotating overhead spray so that all sheep therein will be sprayed; the rails of the enclosure may be of pipe form and the latter may be adapted to deliver spray mixture through suitable perforations. The solution, after spraying, is returned to a reservoir through suitable runways; such returned solution always contains objectionable solid material and it is proposed, therefore, to pass the returning solution through a filter. It has been found that a perforated inclined channel, receiving returned solution from the spray enclosure, and passing over the solution reservoir, makes a simple and effective filter; alternatively the filter may be in the form of an endless moving mesh screen passing over the solution reservoir, but extending beyond the reservoir, so that solid material is dropped from the moving screen beyond the reservoir. As there is no fixed period for spraying sheep, and as the growth of wool on the sheep varies according to the period of time from shearing, it is desirable that provision be made to vary the amount and pressure of spray mixture in accordance with such varying growth of wool. This may be achieved, conveniently, by known means and the requisite conditions ensured by incorporating a suitable gauge or other indicating means in the spray line.

In the drawings, which show an approved form of the invention,

Figure 3 is a perspective view of a rotatable spray arm showing a disposition of spray nozzles, Figure 4 is a perspective view showing one form of filter.

Figure 5 is a sectional elevation, showing an alternative form of filter and its appurtenances, Figure 6 is a vertical section on the line 6—6 of Figure 5.

Figure 1:
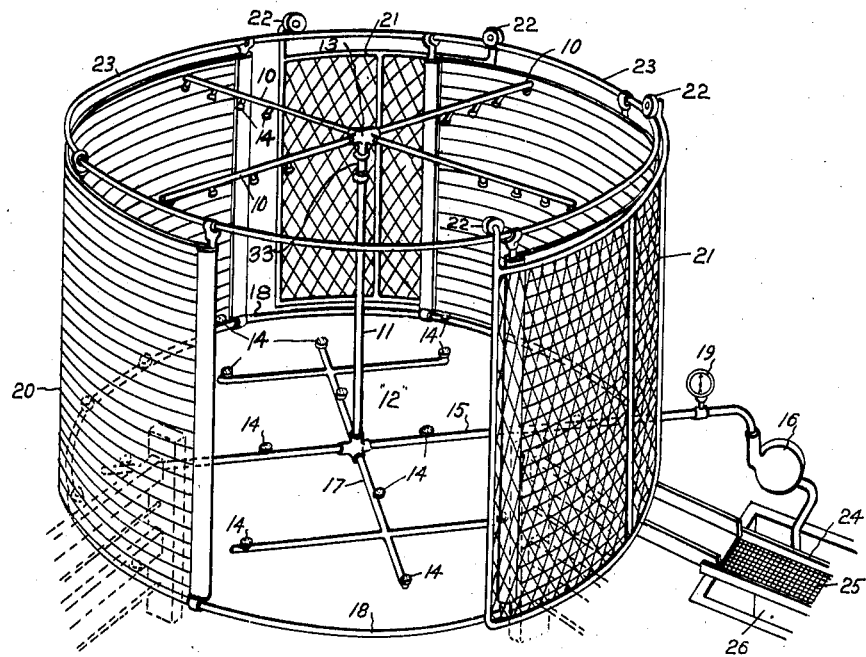
Figure 1 is a perspective view.
Figure 2:
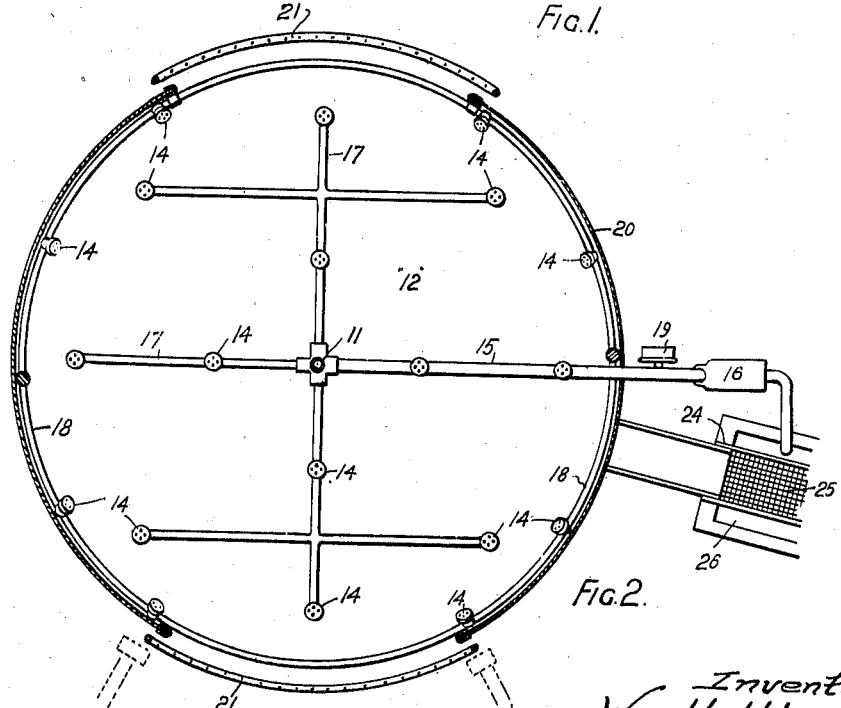
Figure 2 is a sectional plan thereof.
Figure 7:
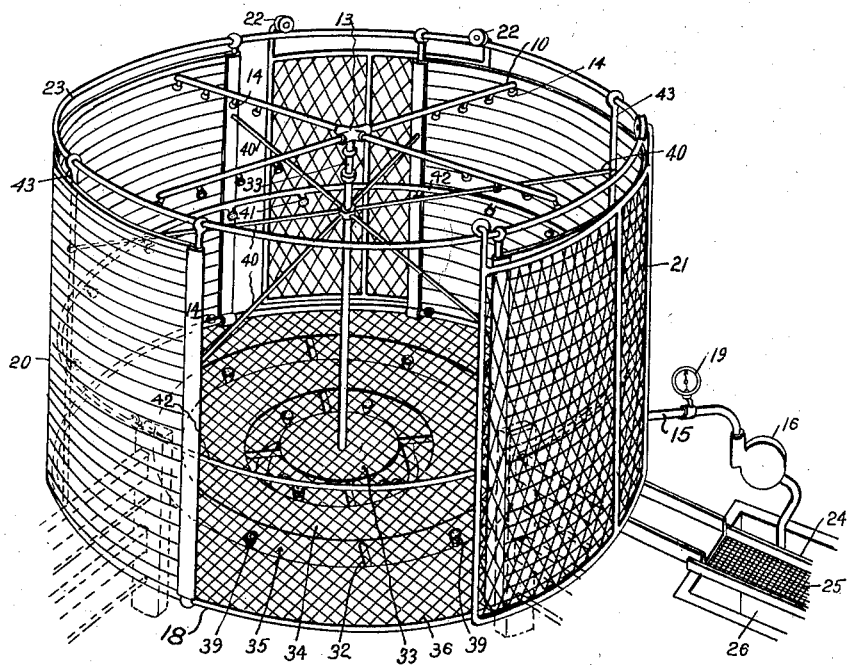
Figure 7 is a perspective view of a modified form of the invention.
Figure 8:
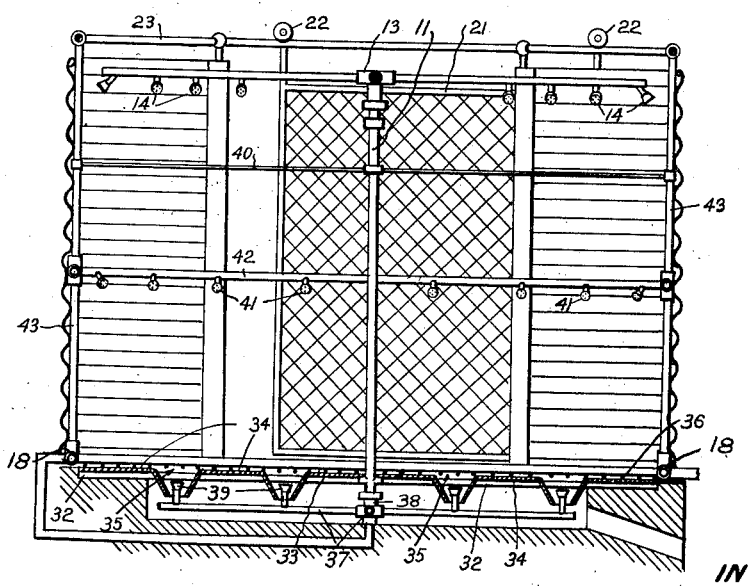
Figure 8 is a vertical sectional elevation of the form of the invention shown in Figure 7.

Referring to the drawings, 10 are overhead rotatable spray arms adapted to revolve upon a stand pipe 11 which is situated, preferably, at the centre of the spray enclosure 12; the spray arms 10, together with the solution carried therein, are of a substantial weight and, in order to facilitate the rotary movement of such arms about the stand pipe 11 and, at the same time, render them substantially fluid tight about the point of rotation, the said spray arms are carried, preferably, through a union 13 upon a sleeve 33 which fits into the top of the stand pipe 11 and which rides on a ball race; however, the spray arms may be carried otherwise upon the stand pipe in accordance with known means. 14 are jets disposed upon the arms 10 and so placed that, when the spray fluid is forced through them, they will cause the arms 10 to rotate steadily. As indicated in Figure 3 the spray jets 14 preferably are set on the arms 10 at an inclined angle and the outer end jet on each arm may be set to spray the wall of the enclosure so that sheep leaning against the said wall may be adequately treated. As shown in the drawings the stand pipe 11 is connected across the floor of the enclosure 12 through a delivery pipe 15 and a pump 16 to a reservoir 26. 17 are fixed spray pipes situated on the floor of the enclosure 12, in circuit with the delivery pipe 15 and provided with jets 14. 18 is a circular pipe with jets 14 arranged at the floor level and connected with the delivery pipe 15. 19 is a gauge.

It is preferred that the wall 20 of the spray enclosure 12 be of circular form and that the entrance and exit gates 21 thereof also should be arcuate and of the same radius as the enclosure so that they may slide about the circle of the enclosure. The gates 21, which may run on rollers 22 carried on pipe 23 at the top of the enclosure, are preferably formed of wire mesh or other material giving a view into the enclosure and, also for preference, are placed opposite to each other so that sheep entering the enclosure are enabled to see previously sprayed sheep standing in the draining pen beyond the spray enclosure whereby the sheep will enter the spray enclosure more readily. With the employment of curved gates the apparatus is applied readily to existing yards and fences and the size of the opening through which the sheep pass is readily regulated; this is a feature of some advantage since it is known that some sheep run better through a wide gate whilst others prefer a narrow one. The use of a circular spray enclosure eliminates corners and facilitates handling of the sheep.

Figure 4 shows one form of filter for returned solution. The apparatus is set up, in known manner, to allow the sprayed solution to return to the filter which, in this view, is shown as an inclined channel 24 provided with perforations 25 where it passes above the solution reservoir 26. 27 is a waste sump. Figures 5 and 6 show an alternative form of filter including a solution return 28, a mesh 29 carried by endless sprocket chains 30, a chute 31, a reservoir 26 and a waste sump 27. Suitable driving means for the endless sprocket chains, of known character, is indicated and also a rotating brush 29a for cleaning the mesh 29 is shown If desired the spraying enclosure may be provided with a batten floor. As previously mentioned the floor sprays, where employed, may be arranged to rotate. This may be achieved conveniently by placing the sprays under the floor and providing the latter with concentric openings located above the spray nozzles. In this case the floor and shower sprays may be rotated together or separately; where the floor and shower sprays are to be rotated together this is conveniently achieved by attaching the floor and shower spray arms to the stand pipe by fixed unions and arranging the stand pipe to rotate. The pump delivery pipe 15 is connected with the circular pipe 18 and an additional pipe 18a supplies liquid from the pipe 18 to the lower extremity of the stand pipe 11, the additional pipe 18a being conveniently embedded in the foundation upon which the spray enclosure is erected.

In operation solution is pumped from the reservoir 26 through the delivery pipe 15 and stand pipe 11 to the arms 10 where it is delivered through the jets 14, the arms 10 and jets 14 being arranged so as to cause the said arms 10 and the jets 14 to rotate or to partly rotate when solution is forced through them. The spray is delivered in a series of regular splashes, and not in a continuous stream, thus giving the sheep freedom to breathe and eliminating the possibility of their becoming asphyxiated and, at the same time, adequately spraying the sheep with the solution. By placing the jets at an inclined angle on the arms 10 the spray is delivered in a criss-cross fashion giving an improved effect. The rotating shower spray may be driven by any suitable means, manual, mechanical, or otherwise. Side sprays have been referred to herein and, where employed, preferably are set to cross about sheep head height. In the form of filter shown in Figure 4 solid material deposited on the channel 24 is gradually washed into the sump 27. In the filter shown in Figures 5 and 6 solids, which deposit on the moving mesh screen, are carried away so that a cleared surface is always presented to returning solution thus preventing clogging.

Having thus described and ascertained my said invention and the manner in which it is to be performed, I declare that what I claim as new and desire to secure by Letters Patent is:

1. Apparatus for spraying sheep and other animals comprising, hollow overhead rotatable spray arms assembled to receive spray fluid from a source of fluid supply, a series of spray jets on each spray arm, said spray jets being inclined downwardly at an angle to the vertical position, the outer of each series of spray jets being inclined outwardly, a circular enclosure about said spray arms having its wall placed within the spray path of said outer jets, a floor for said enclosure, rotatable spray arms provided with upwardly directed spray jets below said floor and assembled to rotate when the overhead spray arms rotate, and said floor having openings to permit the spray fluid to pass therethrough from the spray jets below the floor.

2. Apparatus for spraying sheep and other animals comprising, hollow overhead rotatable spray arms assembled to receive spray fluid from a source of fluid supply, a series of spray jets on each spray arm, said spray jets being inclined downwardly at an angle to the vertical position, the outer of each of said series of spray jets being inclined outwardly, a circular enclosure about said spray arms having its wall placed within the spray path of said outer jets, diametrically opposed gates in said enclosure wall, said gates being assembled to move on the circumference of said enclosure wall and fashioned to allow a view through the enclosure when closed.

3. Apparatus for spraying sheep and other animals comprising in combination, a reservoir for spray fluid, a delivery pipe therefrom, a pump to deliver fluid from the reservoir through the delivery pipe, hollow overhead rotatable spray arms assembled to receive fluid from the delivery pipe, a series of spray jets on each spray arm, said spray jets being inclined downwardly at an angle to the vertical position, the outer of each of said series of spray jets being inclined outwardly, a circular enclosure about said spray arms having its wall placed within the spray path of said outer jets, and a circumferential tubular stay on said enclosure wall in circuit with the delivery pipe and having inwardly directed spray nozzles.

4. Apparatus for spraying sheep and other animals comprising, hollow overhead rotatable spray arms assembled to receive spray fluid from a source of fluid supply, a series of spray jets on each spray arm, said spray jets being inclined downwardly at an angle to the vertical position, the outer of each series of spray jets being inclined outwardly and a circular enclosure about said spray arms having its wall placed within the spray path of said outer jets.

5. Apparatus for spraying sheep and other animals comprising, hollow overhead rotatable spray arms, a delivery pipe leading from a reservoir for spray fluid to said rotatable spray arms and a pump to deliver said spray fluid through said delivery pipe, a series of spray jets on each spray arm said spray jets being inclined downwardly at an angle to the vertical position, the outer of each series of spray jets being inclined outwardly, a circular enclosure about said spray arms having its wall placed within the spray path of said outer jets, a downwardly inclined runway leading from the floor of the enclosure to the aforesaid reservoir and a filter between said runway and the reservoir.

WALTER HENRY HIGGINS.